(12) United States Patent
Kawasaki et al.

(10) Patent No.: US 9,182,276 B2
(45) Date of Patent: Nov. 10, 2015

(54) SEMICONDUCTOR INTEGRATED CIRCUIT FOR OPTICAL SENSOR

(71) Applicants: Yuya Kawasaki, Tokyo (JP); Markus Oberascher, New Taipei (TW)

(72) Inventors: Yuya Kawasaki, Tokyo (JP); Markus Oberascher, New Taipei (TW)

(73) Assignees: MITSUMI ELECTRIC CO., LTD., Tokyo (JP); EVERLIGHT ELECTRONICS CO., LTD., New Taipei (TW)

( * ) Notice: Subject to any disclaimer, the term of this patent is extended or adjusted under 35 U.S.C. 154(b) by 0 days.

(21) Appl. No.: 14/331,308

(22) Filed: Jul. 15, 2014

(65) Prior Publication Data

US 2015/0036126 A1 Feb. 5, 2015

(30) Foreign Application Priority Data

Jul. 31, 2013 (JP) ................................. 2013-158412

(51) Int. Cl.
*G01J 1/42* (2006.01)
*G01J 3/36* (2006.01)
*G01J 1/44* (2006.01)
*G01J 1/04* (2006.01)

(52) U.S. Cl.
CPC .............. *G01J 1/4228* (2013.01); *G01J 1/0492* (2013.01); *G01J 1/44* (2013.01); *G01J 3/36* (2013.01); *G01J 2001/444* (2013.01)

(58) Field of Classification Search
CPC .............. G01J 1/4228; G01J 3/36; G01J 1/44; G01J 2001/444
USPC .......... 356/213–233; 250/214 AL; 340/686.6
See application file for complete search history.

(56) References Cited

U.S. PATENT DOCUMENTS

| 7,907,061 | B2 | 3/2011 | Lin et al. | |
|---|---|---|---|---|
| 2008/0204396 | A1* | 8/2008 | Otome | ......................... 345/102 |
| 2012/0049048 | A1 | 3/2012 | Dyer | |
| 2014/0341285 | A1* | 11/2014 | Sakurai et al. | ........... 375/240.12 |

FOREIGN PATENT DOCUMENTS

| JP | H06-030059 | 2/1994 |
|---|---|---|
| JP | 2011-058853 | 3/2011 |
| JP | 2012-004691 | 1/2012 |
| JP | 2012-083174 | 4/2012 |
| JP | 2012-231031 | 11/2012 |
| TW | I223513 | 11/2004 |
| TW | 200930148 | 7/2009 |
| TW | 201219760 | 5/2012 |
| TW | 201320597 | 5/2013 |

* cited by examiner

*Primary Examiner* — Hoa Pham
(74) *Attorney, Agent, or Firm* — IPUSA, PLLC

(57) ABSTRACT

There is provided a semiconductor integrated circuit for an optical sensor for receiving environmental light through a cover member that attenuates visible light and transmits infrared light and a collecting lens, performing luminosity factor correction based on an amount of received light, and detecting an illuminance, wherein the semiconductor integrated circuit includes a first light receiving element having a first spectral property; a second light receiving element having a second spectral property; and a luminosity factor correction unit configured to perform the luminosity factor correction according to output of the first light receiving element and output of the second light receiving element, wherein the luminosity factor correction unit includes an AD conversion unit performed by time division on the output of the first light receiving element and the output of the second light receiving element, and a calculating unit subtracting digital signals obtained by the conversion.

10 Claims, 8 Drawing Sheets

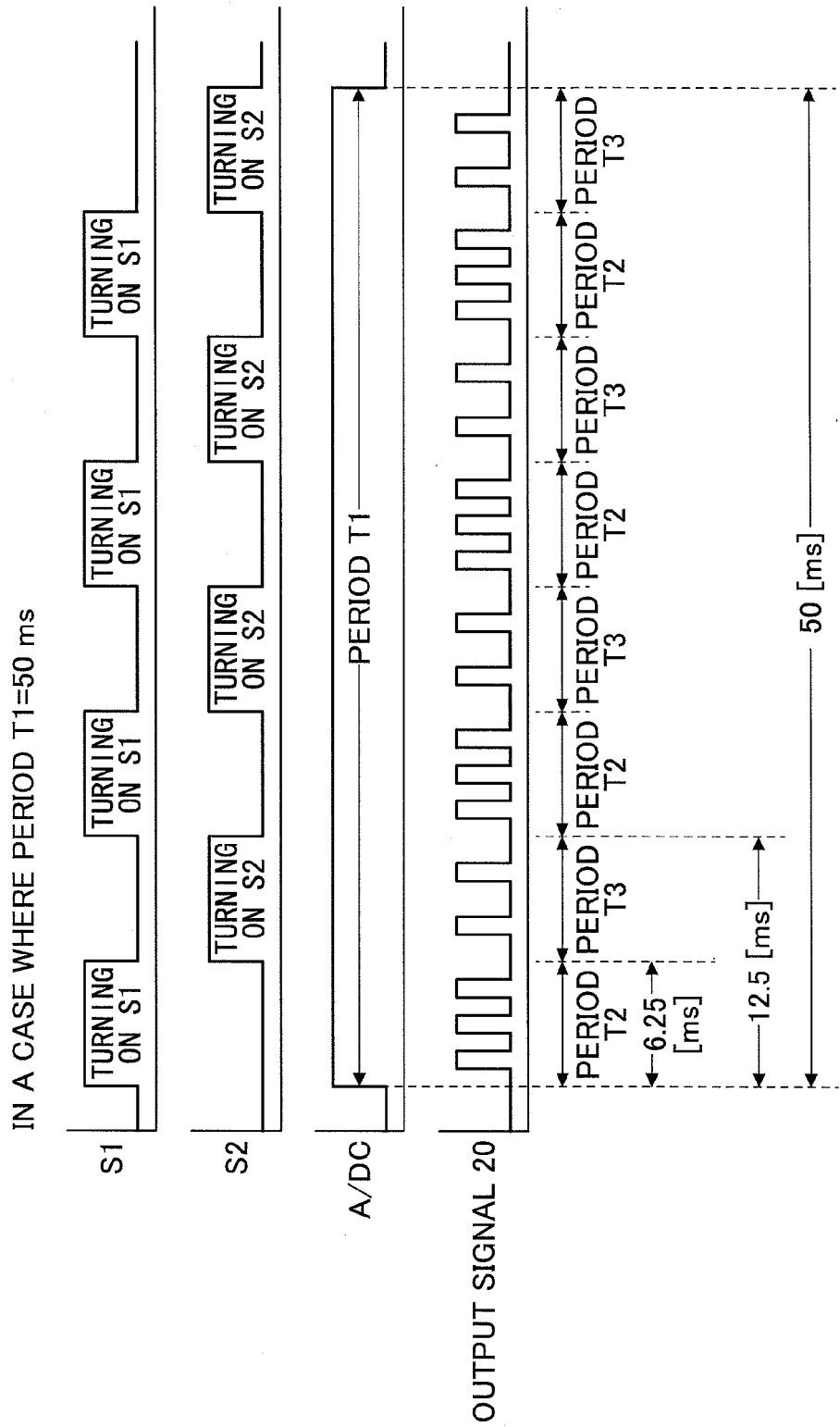

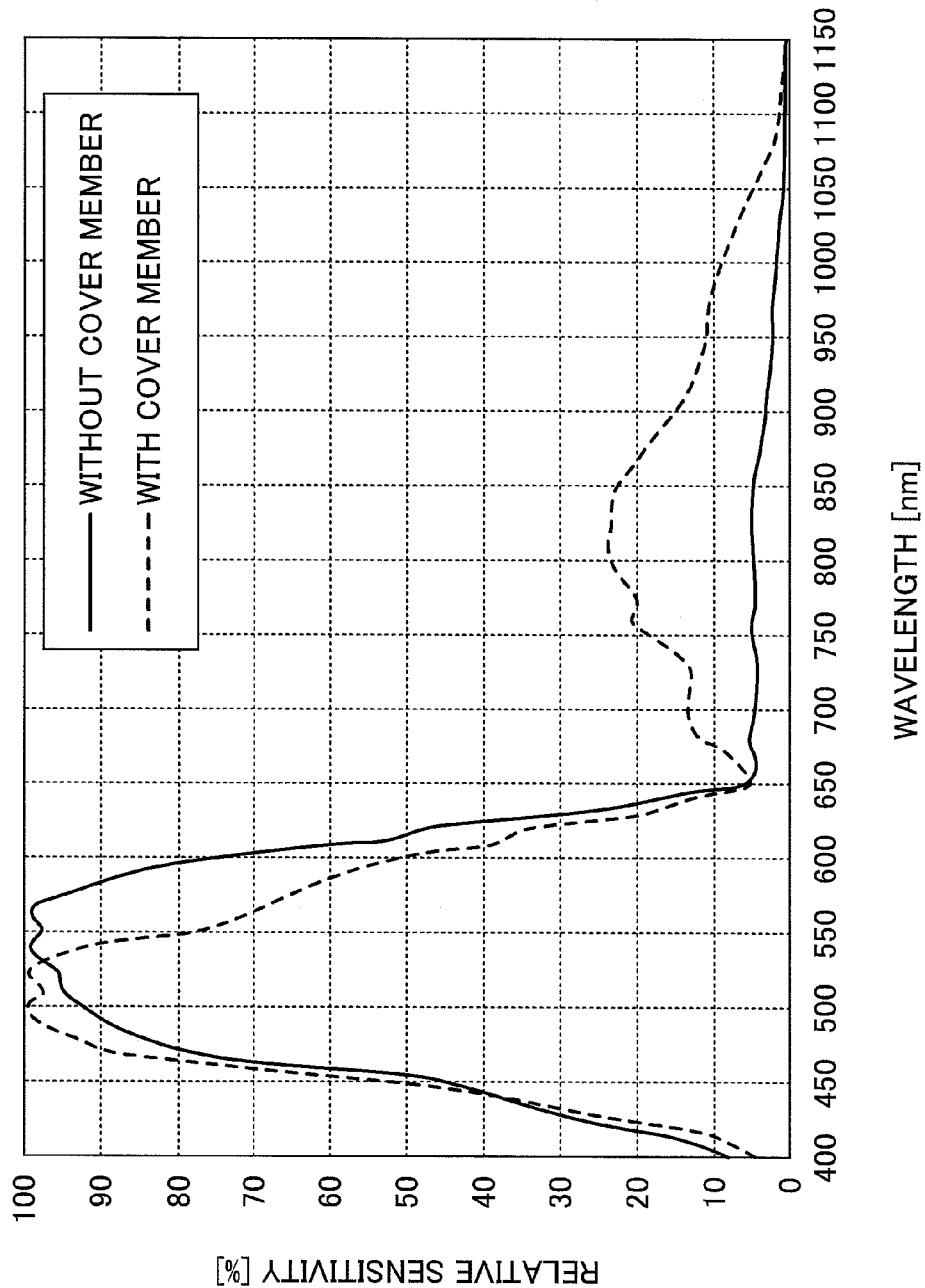

SEMICONDUCTOR INTEGRATED CIRCUIT FOR OPTICAL SENSOR

CROSS-REFERENCE TO RELATED APPLICATIONS

This patent application is based upon and claims the benefit of priority of Japanese Patent Application No. 2013-158412, filed on Jul. 31, 2013, the entire contents of which are incorporated herein by reference.

BACKGROUND OF THE INVENTION

1. Field of the Invention

The present invention relates to a semiconductor integrated circuit for an optical sensor.

2. Description of the Related Art

In recent years, in mobile devices such as mobile phones and smartphones, an illuminance sensor and a proximity sensor mounted in a single compact package are installed, for the purpose of adjusting luminance and improving visibility of a display screen in conformance with the environmental light, or for saving power during a telephone call. These sensors are usually covered by a cover member such as a black cover glass, which substantially blocks visible light.

The spectral property of illuminance sensors is required to be as close as possible to the luminosity factor property (a spectral property similar to that of human eyes). To achieve this, there are known two methods.

The first method is to use one photo diode and either a special epoxy for the package, which functions as an optical filter, or a coating that is directly applied onto the photo diode so as to function as a spectral filter. The second method is using two photo diodes. One photo diode is sensitive to visible light and infrared, and the second photo diode is only sensitive to infrared. To obtain the luminosity factor property similar to human eyes, the spectrum property (the measurement value) of the photo diode sensitive to the infrared is subtracted from the spectrum property (the measurement value) of the photo diode sensitive to the visible light and the infrared. Because the calculation is not automatically performed by the sensor, it is necessary to be performed by a CPU or the like. The calculation formula is different depending on the IR contents of each lamp.

In both methods, a slight relative sensitivity remains in the infrared range, to an extent that does not cause a serious influence in normal uses.

However, in many applications (for example mobile phones or TVs), the illuminance sensor is placed behind a cover member such as a panel, or the like, due to design reasons. The panel, or the like, has a very low transmittance in the visible light range and a high transmittance in the infrared range. This affects the overall spectral property of the sensor, because after placing the sensor behind the panel or the like, the sensor may receive much infrared. This causes erroneous measurements similar to a measurement using different light sources. For light sources with less IR content (like a fluorescent light or a LED), only a small amount of visible light can pass the black panel. This is because the visible light is substantially blocked by the black panel.

However, in light sources with high IR content (like an incandescent lamp), the measurement value of the infrared will be very high as long as the illumination is the same. This is because the visible light is substantially blocked by the panel or the like, a great amount of IR will transmit therethrough and cause increased measurement values for the infrared. As a result, adjustments of lighting and backlighting will not be accurate under different light sources.

FIG. 8 illustrates a spectral property of an a photo diode (PD) for an illuminance sensor in a case where the PD is covered with a cover member such as black glass and in comparison with a case where the PD is not covered with the cover member such as the black glass. Then, the sensor becomes relatively sensitive to infrared light after placing it behind the black glass, and an erroneous luminosity measurement is observed.

There is disclosed a technology of performing luminosity factor correction by subtracting the output current of two PDs through a current mirror circuit and performing AD conversion by an AD converter (see, for example, U.S. Laid-open Patent Publication No. 2012/0049048).

Furthermore, there is disclosed a technology of performing AD conversion with different AD converters on the output currents of two photo-sensors having different spectral properties, and performing digital calculation to measure the illuminance (see, for example, Japanese Laid-Open Patent Application No. 2011-58853).

SUMMARY OF THE INVENTION

However, in a current mirror circuit, it is difficult to secure precision with respect to a minute electric current, and therefore it is difficult to perform luminosity factor correction at high precision. Furthermore, when AD conversion is performed with different AD converters on the output current of the PD for an illuminance sensor and the output current of the PD for luminosity factor correction, conversion errors occur among the digital signals after the conversion, due to variations among the AD converters, and therefore it is difficult to perform luminosity factor correction with high precision.

MEANS FOR SOLVING THE PROBLEM

The embodiment of the present invention has been provided in view of the above problems, and it is an object of the present invention to provide a semiconductor integrated circuit for an optical sensor for performing luminosity factor correction at high precision.

A semiconductor integrated circuit for an optical sensor according to the present embodiment has the requirements of receiving environmental light through a cover member that attenuates visible light and transmits infrared light and a collecting lens, performing luminosity factor correction based on an amount of received light, and detecting an illuminance of the environmental light, wherein the semiconductor integrated circuit for the optical sensor includes a first light receiving element having a first spectral property; a second light receiving element having a second spectral property; and a luminosity factor correction unit configured to perform the luminosity factor correction according to output of the first light receiving element and output of the second light receiving element, wherein the luminosity factor correction unit includes an AD conversion unit configured to perform AD conversion by time division on the output of the first light receiving element and the output of the second light receiving element, and a calculating unit configured to subtract digital signals obtained by the conversion at the AD conversion unit.

In one embodiment, the semiconductor integrated circuit for the optical sensor further comprises a proximity sensor.

In one embodiment, a semiconductor integrated circuit for an optical sensor for receiving an environmental light is provided. It performs luminosity factor correction based on an amount of received light and detects an illuminance of the environmental light. It comprises a proximity sensor, a first light receiving element, a second light receiving element and a luminosity factor correction unit. The first light receiving element has a first spectral property. The first spectral property has a first maximum sensitivity at a first wavelength. The second light receiving element has a second spectral property. The second spectral property has a second maximum sensitivity at a second wavelength. The first wavelength is different from the second wavelength. The luminosity factor correction unit is configured to perform the luminosity factor correction according to output of the first light receiving element and output of the second light receiving element.

In one embodiment, the luminosity factor correction unit comprises an AD conversion unit and a calculation unit. The AD conversion unit is configured to perform AD conversion by time division on the output of the first light receiving element and the output of the second light receiving element. The calculating unit is configured to subtract digital signals obtained by the conversion at the AD conversion unit.

In one embodiment, the luminosity factor correction unit further comprises a multiplier and a correction coefficient setting unit. The multiplier is configured to multiply the digital signal corresponding to the output of the second light receiving element by a correction coefficient. The correction coefficient setting unit is configured to set the correction coefficient.

In one embodiment, the first spectral property is obtained by a first filter for transmitting a first light having the first wavelength, and the second spectral property is obtained by a second filter for transmitting a second light having the second wavelength.

In one embodiment, the first spectral property is obtained by a first filter for transmitting a visible light having the first wavelength, and the second spectral property is obtained by a second filter for transmitting a non-visible light having the second wavelength.

Additional objects and advantages of the embodiments are set forth in part in the description which follows, and in part will become obvious from the description, or may be learned by practice of the invention. The objects and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 7 is another example of a timing chart of an AD converter according to the embodiment of the present invention.

FIG. 8 is an example of a spectral property.

DETAILED DESCRIPTION OF EMBODIMENTS

Figure 1:
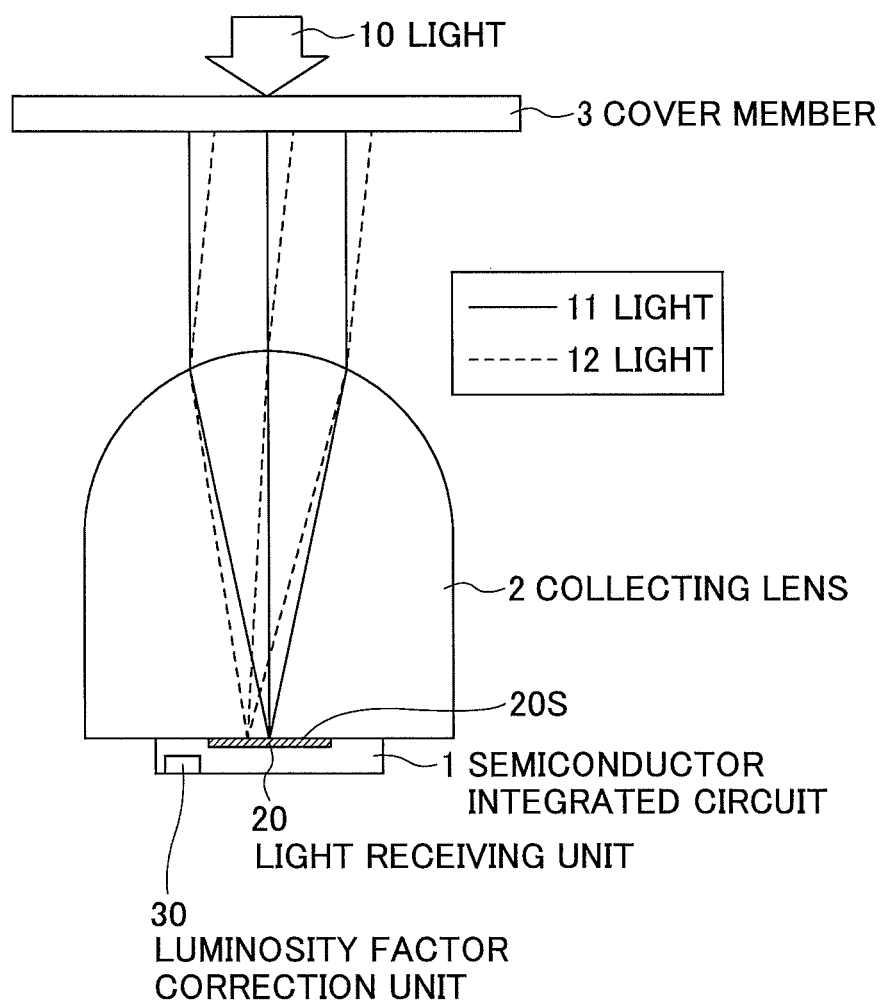
FIG. 1 schematically illustrates how light enters a semiconductor integrated circuit for an optical sensor according to an embodiment of the present invention.
Figure 2:
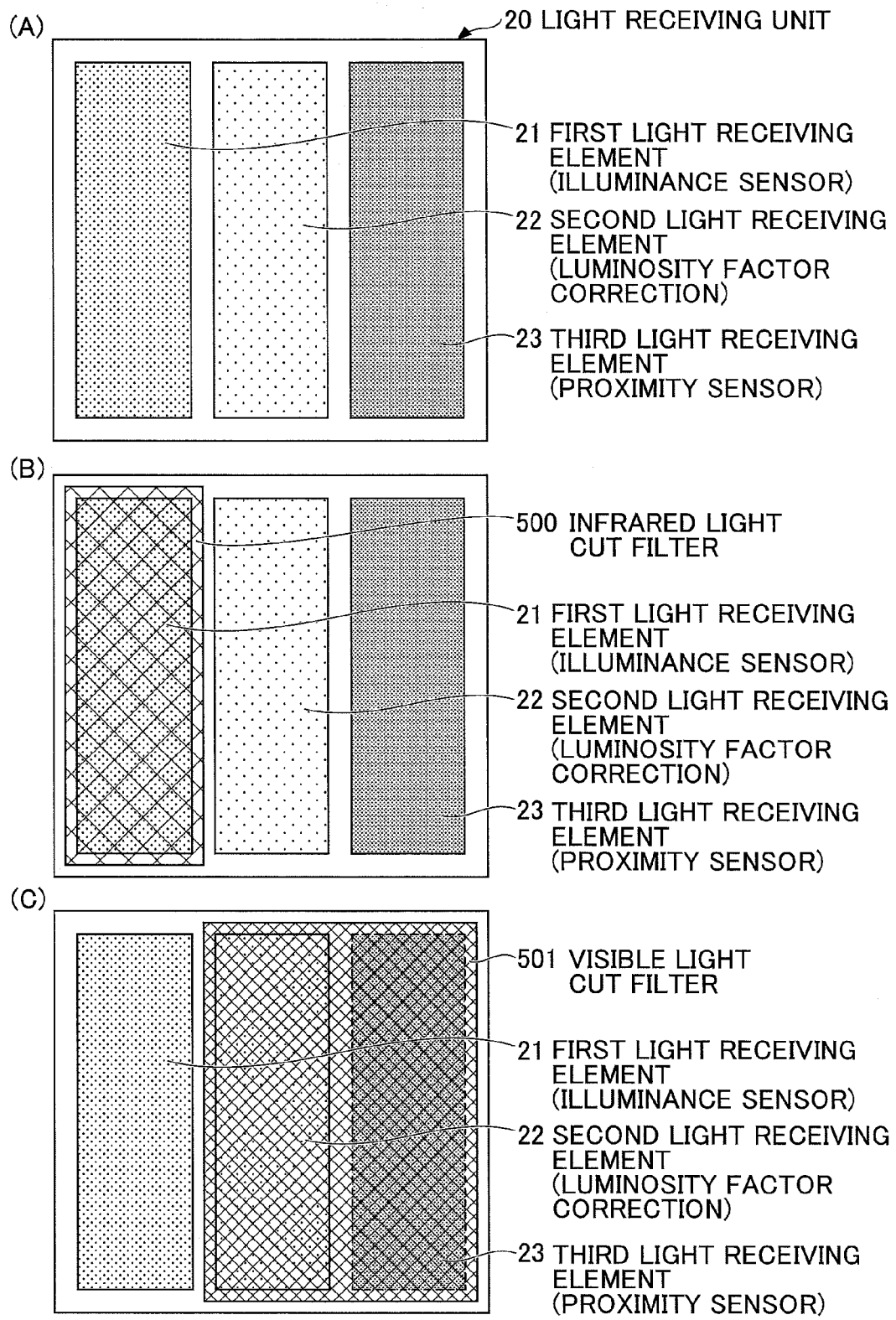
FIG. 2 illustrates a configuration of the semiconductor integrated circuit for the optical sensor according to the embodiment of the present invention.
Figure 3:
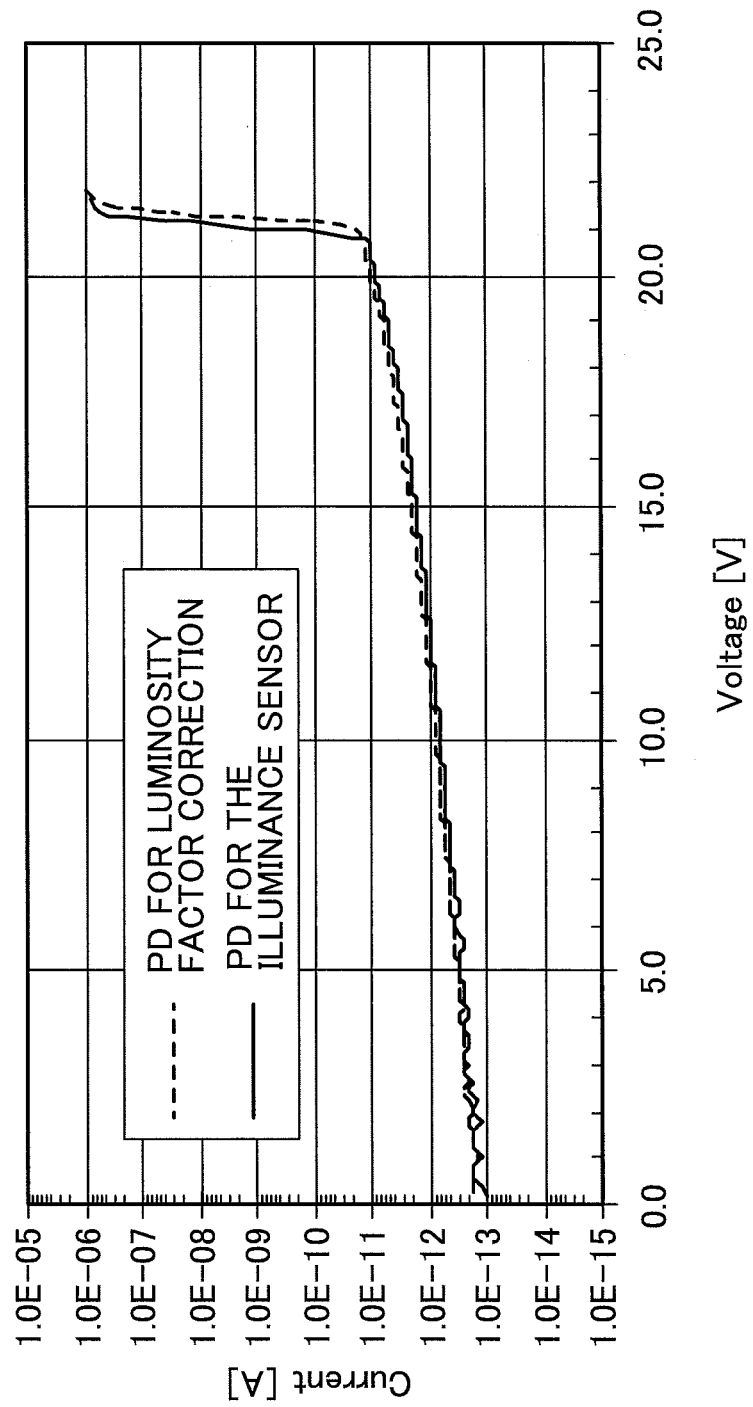
FIG. 3 is a graph indicating the relationship between the voltage and a dark current in a light receiving element according to the embodiment of the present invention.

Embodiments of the present invention are described below with reference to FIGS. 1 to 8. In the figures, the same elements are denoted by the same reference numerals, and overlapping descriptions are omitted. Reference symbols typically designate as follows:
1: semiconductor integrated circuit for an optical sensor;
2: collecting lens;
3: cover member;
20: light receiving unit;
20S: surface of light receiving unit;
10: environmental light;
21: first light receiving element;
22: second light receiving element;
23: third light receiving element;
30: luminosity factor correction unit;
311: switch circuit;
312: switch circuit;
313: AD converter;
314: first decimation filter;
315: second decimation filter;
316: multiplier;
317: control circuit;
318: adder;
500: infrared light cut filter (first filter);
501: visible cut filter (second filter);
24, 25, 120, 140, 150, 160, 170: signals; and
S1, S2: switch element In the present specification, "relative sensitivity" means the sensitivity of a light receiving element for an illuminance sensor in the respective wavelengths (a wavelength of 400 nm through a wavelength of 1150 nm), in spectral properties normalized assuming that the sensitivity in a certain wavelength (maximum sensitivity). Furthermore, in the present specification, a planar shape is a shape of an object viewed from a normal line direction of a surface $20s$ of a light receiving unit 20.

[Configuration of Semiconductor Integrated Circuit for an Optical Sensor]

At first, a simple description is given of an example of a configuration of a semiconductor integrated circuit for the optical sensor according to the present embodiment, and a flow from when the semiconductor integrated circuit for the optical sensor receives environmental light until the semiconductor integrated circuit for the optical sensor detects the illuminance, with reference to FIG. 1.

A semiconductor integrated circuit for the optical sensor 1 includes a light receiving unit 20 and a luminosity factor correction unit 30.

Light 10 (an environmental light) enters the light receiving unit 20 through a cover member 3 and a collecting lens 2. The light receiving unit 20 includes a plurality of light receiving elements formed on the same substrate. Each light receiving element includes a photoelectric conversion element, an electrode or the like, and current flows through the light receiving element based on the amount of received light. As each light receiving element, a PN type photodiode, a PIN type photodiode, a photo-transistor, or the like, may be used. The output current of each light receiving element is a weak current of a pA order, but the technical feature of the present invention is not limited thereto.

Light 11 is light entering from a perpendicular direction with respect to a surface 20s of the light receiving unit 20 (hereinafter, straight light), and light 12 is light entering from a perspective direction with respect to the surface 20s of the light receiving unit 20 (hereinafter, perspective light).

The cover member 3 is used as a cover member for hiding the light receiving unit 20, and is thus formed with black resin, black glass, or the like. The cover member 3 attenuates visible light (blocks approximately 90%), and transmits infrared light. By appropriately adjusting the thickness, the material, and the light blocking ratio of the cover member 3, it is possible to change the amount of environment light received by the light receiving unit 20.

The collecting lens 2 collects light transmitted through the cover member 3. The position of the light collected at the light receiving unit 20 differs according to the case where straight light enters and the case where perspective light enters. In either case, the variation in the amount of received light among the plurality of light receiving elements formed in the light receiving unit 20, is preferably small. The type of collecting lens 2 is not particularly limited; a convex lens, a cylindrical lens, or combination of any optical elements, or the like, may be used.

The luminosity factor correction unit 30 performs luminosity factor correction by alternately performing AD conversion on the output current from the light receiving element for the illuminance sensor and the light receiving element for luminosity factor correction, with the same AD converter, and performing arithmetic processing. The arithmetic processing is performed by subtracting a digital signal corresponding to the output current of the light receiving element for luminosity factor correction multiplied by a correction coefficient, from a digital signal corresponding to the output current of the light receiving element of the illuminance sensor. By performing luminosity factor correction at high precision at the luminosity factor correction unit 30 so that the spectral properties of the light receiving element for the illuminance sensor comes near the luminosity factor properties, it is possible to reduce erroneous detections by the semiconductor integrated circuit for the optical sensor 1.

[Configuration of Light Receiving Unit]

FIG. 2(A) illustrates a configuration of the light receiving unit 20 included in the semiconductor integrated circuit for the optical sensor 1 according to the present embodiment.

The light receiving unit 20 includes a first light receiving element 21, a second light receiving element 22, and a third light receiving element 23. As shown in FIG. 2(A), the first light receiving element 21 is a light receiving element for the illuminance sensor, the second light receiving element 22 is a light receiving element for luminosity factor correction, and the third light receiving element 23 is a light receiving element for a proximity sensor.

The illuminance sensor detects the brightness in the surroundings based on the amount of environmental light received by the first light receiving element 21. Furthermore, the proximity sensor detects the proximity of an object according to the changes in the amount of infrared light received by the third light receiving element 23. The proximity sensor detects weak infrared light reflected from a moving object, and therefore the third light receiving element 23 is preferably designed to have high sensitivity.

The first light receiving element 21 has first spectral property. The first spectral property has a high relative sensitivity in a visible light area. For example, the first spectral property has a maximum sensitivity at a wavelength of approximately 550 nm, and has a slight relative sensitivity at a wavelength of approximately 800 nm.

As illustrated in FIG. 2(B), an infrared light cut filter (first filter) 500 is preferably formed to cover the first light receiving element 21. An infrared light cut filter transmits visible light and blocks infrared light. By forming this filter, the relative sensitivity in the infrared light area of the first spectral property can be reduced.

The second light receiving element 22 and the third light receiving element 23 have a second spectral property. The second spectral property has a high relative sensitivity in the infrared light area.

As illustrated in FIG. 2(C), a visible cut filter (second filter) 501 is preferably formed to cover the second light receiving element 22 and the third light receiving element 23. The visible light cut filter transmits infrared light and blocks visible light. By forming this filter, the relative sensitivity in the visible light area of the second spectral property can be further reduced. In one embodiment, a visible cut filter (second filter) is formed to only cover the second light receiving element 22.

When forming the second filter, the second light receiving element 22 and the third light receiving element 23 are preferably arranged adjacent to each other so that the second filter can cover both the second light receiving element 22 and the third light receiving element 23 at the same time. In one embodiment, the arrangement and orientation of the light receiving elements are not limited thereto.

[Luminosity Factor Correction Unit]

Figure 4:
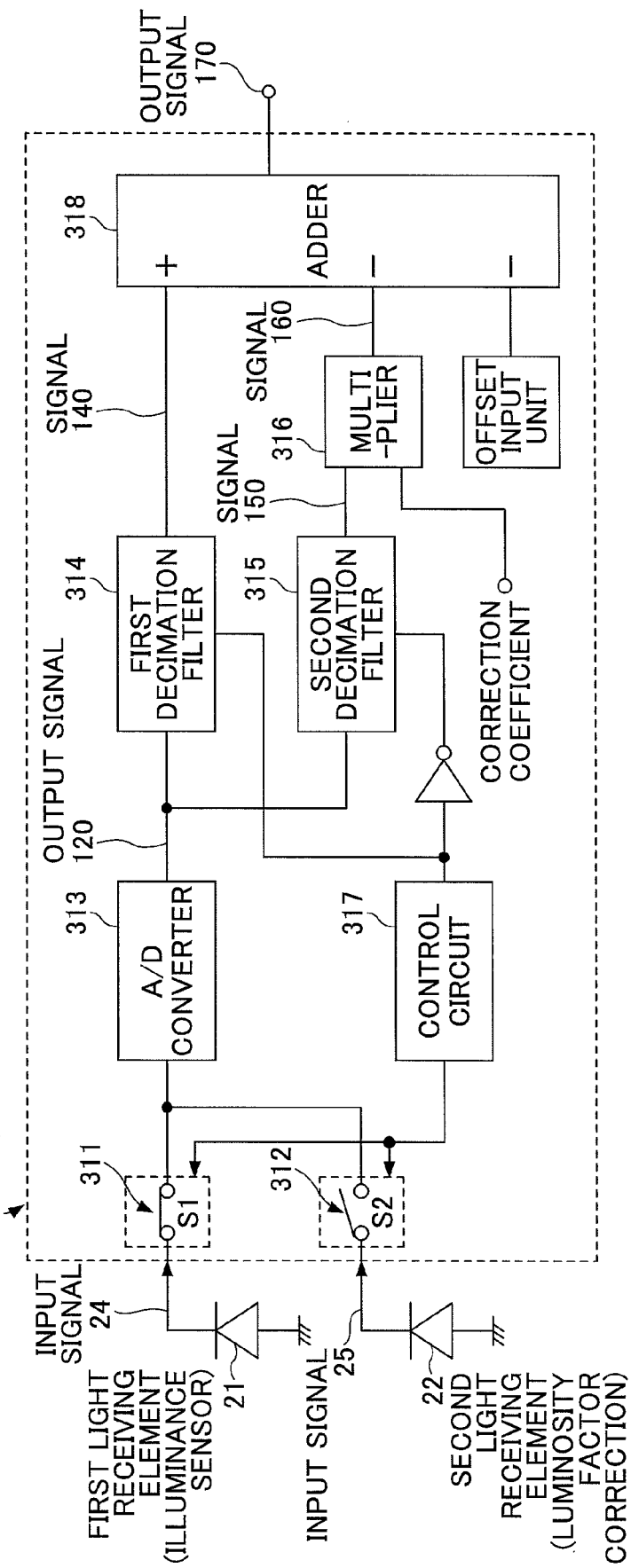
FIG. 4 illustrates a configuration of the semiconductor integrated circuit for the optical sensor according to the embodiment of the present invention.

FIG. 4 illustrates the luminosity factor correction unit 30 included in the semiconductor integrated circuit for the optical sensor 1 according to the present embodiment.

The luminosity factor correction unit 30 includes a switch circuit 311, a switch circuit 312, an AD converter 313, a first decimation filter 314 (for illuminance sensor), a second decimation filter 315 (for luminosity factor correction), a multiplier 316, a control circuit 317, and an adder 318.

The luminosity factor correction unit 30 performs AD conversion by time division on input signals 24, 25 with the AD converter 313, performs thinning with the decimation filters 314, 315, performs arithmetic processing by the multiplier 316 and the adder 318, and outputs output signals 170.

The switch circuit 311 switches the input/non-input of the input signal 24 from the first light receiving element 21 to the AD converter 313. The switching of the on/off of the switch circuit 311 is controlled by the control circuit 317. For example, when the switch circuit 311 is on, the input signal 24 is input to the AD converter 313.

The switch circuit 312 switches the input/non-input of the input signal 25 from the second light receiving element 22 to the AD converter 313. The switching of the on/off of the switch circuit 312 is controlled by the control circuit 317. For example, when the switch circuit 312 is on, the input signal 25 is input to the AD converter 313. In one embodiment, the switch circuits 312 and 314 may be switch elements S1 and S2, respectively.

The control circuit 317 controls the switch circuits so that the timing of on (off) of the switch circuit 311 and the timing of on (off)) of the switch circuit 312 do not coincide with each other (for details, see timing chart described below).

The AD converter 313 (AD converting unit) is, for example, a $\Delta\Sigma$ type AD converter of 16 bits, and performs AD conversion using $\Delta\Sigma$ modulation. Specifically, the AD converter 313 alternately performs AD conversion on the input signals 24, 25 in synchronization with the timings of switching the on/off of the switch circuits 311, 312, and generates an output signal 120 (digital signal). Said differently, the AD converter 313 performs AD conversion by time division on the input signal 24 that is the output of the first light receiving element 21 and the input signal 25 that is the output of the second light receiving element 22, and generates the output signal 120 (digital signal). Furthermore, the AD converter 313 inputs the output signal 120 in the first decimation filter 314 and the second decimation filter 315.

The first decimation filter 314 performs filling on the output signals 120, and generates a signal 140 (digital signal) corresponding to the output current of the first light receiving element 21. Furthermore, the first decimation filter 314 inputs the signal 140 in the adder 318 that is a calculation unit. The second decimation filter 315 performs thinning on the output signals 120, and generates a signal 150 (digital signal) corresponding to the output current of the second light receiving element 22. Furthermore, the second decimation filter 315 inputs the signal 150 in the multiplier 316. As two input signals are alternately subjected to AD conversion by time division by the same AD converter, there is substantially no conversion error between the signal 140 and the signal 150. Note that noise or the like, generated in the output signal 120 may be removed by the decimation filter.

The operation/non-operation of the first decimation filter 314 and the second decimation filter 315 is controlled by the control circuit 317.

The multiplier 316 multiplies the signal 150 by a correction coefficient, and generates a signal 160 (digital signal). Note that in the multiplier 316, an inverter is provided, and therefore the signal 160 becomes an inverted signal of the signal 150 multiplied by the correction coefficient.

The adder 318 adds the signal 140 with the signal 160 (actually subtraction), and generates the output signal 170 (digital signal).

Said differently, the signal 160 corresponding to the output current of the second light receiving element 22 that is a light receiving element for luminosity factor correction multiplied by the correction coefficient, is subtracted from the signal 140 corresponding to the output current of the first light receiving element 21 that is the light receiving element for the illuminance sensor. Accordingly, the relative sensitivity in the infrared light area of the first light receiving element 21 can be reduced.

Note that in a case where an offset input unit is provided in the adder 318, and the dark current cannot be completely cancelled out by the arithmetic processing by the luminosity factor correction unit 30, the dark current may be cancelled out by inputting offset from the offset input unit.

The arithmetic processing by the multiplier 316 and the adder 318 is expressed by the following formula.

(signal 140)−{(correction coefficient)×(signal 150)
{=(signal 160)}}=output signal 170

The luminosity factor correction unit 30 may be provided with a correction coefficient setting circuit for arbitrarily setting a correction coefficient, and a correction coefficient selecting circuit (not shown) for appropriately selecting a correction coefficient that has been set. Preferably, by using these circuits, the correction coefficient is appropriately adjusted in conformance with various conditions.

For example, the luminosity factor correction unit 30 may be connected to a CPU through a predetermined interface (for example, an $I^2C$ bus), and the setting or selection of the correction coefficient may be performed from the CPU. In this case, the CPU realizes the correction coefficient setting unit. The correction coefficient setting unit may be realized by software, or hardware, or by both.

Figure 5:
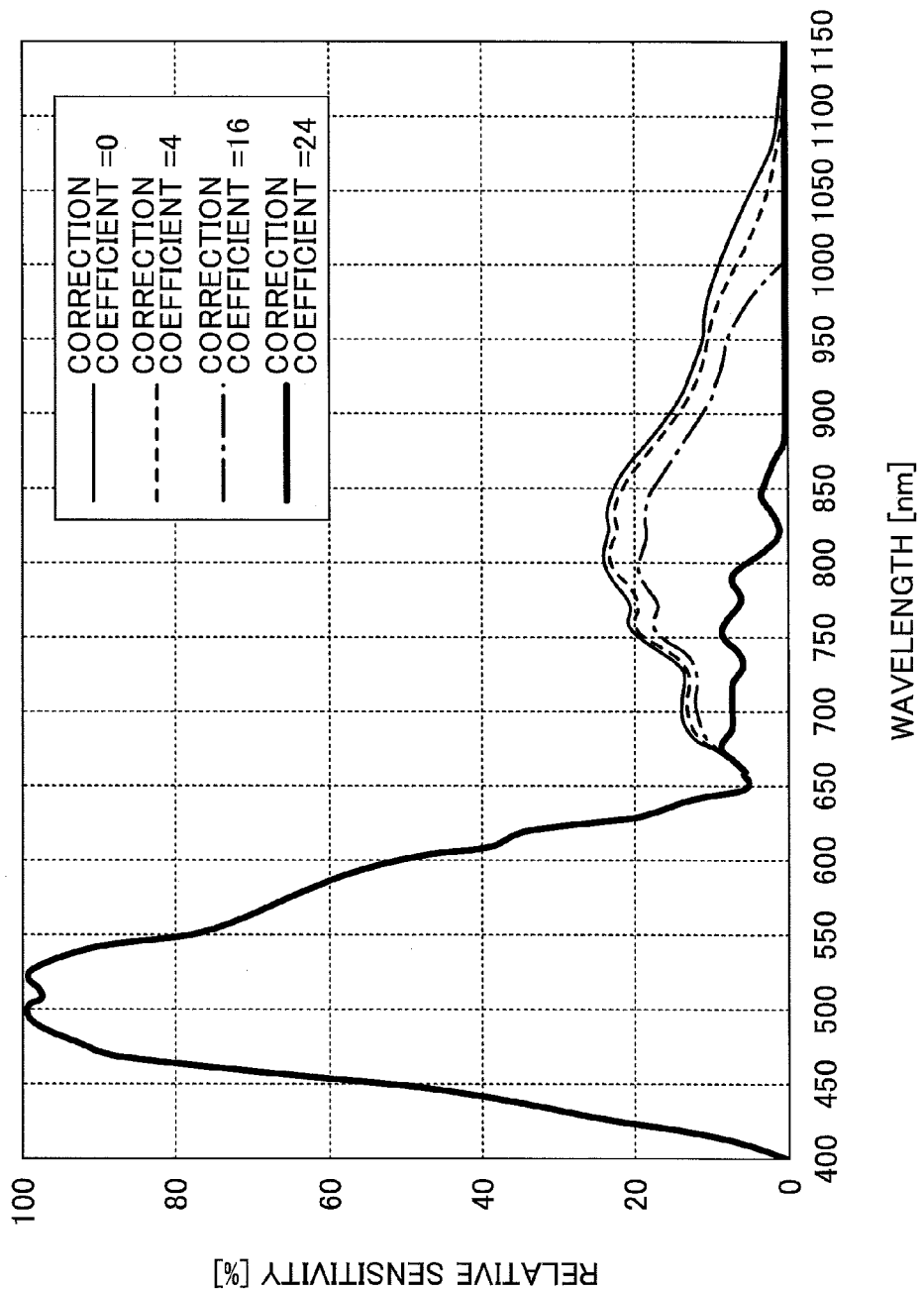
FIG. 5 is a graph indicating the relationship between the wavelength and the relative sensitivity in a light receiving element according to the embodiment of the present invention.

FIG. 5 is a graph indicating the relationship between the relative sensitivity of the first light receiving element 21 covered by the cover member 3 and the wavelength when the correction coefficient is changed. In FIG. 5, the correction coefficient is changed to 0, 4, 16, 24. The horizontal axis indicates the wavelength [nm] (a wavelength of 400 nm through a wavelength of 1150 nm), and the vertical axis indicates the relative sensitivity [%].

As the correction coefficient increases, the relative sensitivity in the infrared light area becomes low. For example, in FIG. 5, when the wavelength is 800 [nm], the relative sensitivity is approximately 25% when the correction coefficient is zero, the relative sensitivity is approximately 6% when the correction coefficient is 24.

Said differently, by changing the correction coefficient, the relative sensitivity in the infrared light area can be controlled. The correction coefficient is preferably appropriately set according to various conditions such as the properties of the light receiving element. The relative sensitivity of the first light receiving element 21 on a bare chip (the light receiving unit 20 is not covered by the cover member 3) is approximately 5% when the wavelength is 800 [nm] and the correction coefficient is zero. By covering the light receiving unit 20 with the cover member 3, the relative sensitivity in the infrared light area is increased.

Table 1 shows the output value (units: count) of the illuminance sensor covered with black glass, under different light sources and different correction coefficients, and the infrared light content ratio is expressed by the measurement result when an incandescent lamp is used and the measurement result when a fluorescent lamp is used.

TABLE 1

| VALUE OF CORRECTION COEFFICIENT | MEASUREMENT RESULT USING FLUORESCENT LAMP | MEASUREMENT RESULT USING INCANDESCENT LAMP | RATIO INCANDESCENT LAMP/ FLUORESCENT LAMP |
|---|---|---|---|
| 0 | 20049 | 47056 | 2.347 |
| 4 | 19953 | 42535 | 2.132 |
| 8 | 20020 | 37990 | 1.898 |
| 16 | 20027 | 29046 | 1.450 |
| 20 | 19274 | 23987 | 1.245 |
| 24 | 19230 | 19477 | 1.013 |
| 28 | 19243 | 15020 | 0.781 (overcompensated) |
| 32 | 19852 | 10900 | 0.548 (overcompensated) |
| 64 | 19568 | 0 | — (overcompensated) |
| 128 | 19040 | 0 | — (overcompensated) |
| 256 | 18088 | 0 | — (overcompensated) |

As the light sources, a fluorescent lamp and an incandescent lamp are used. The fluorescent lamp is a light source having a low infrared light content and the incandescent lamp is a light source having a high infrared light content.

As seen in table 1, the infrared light content can be reduced by increasing the correction coefficient, and that the reduction amount of the infrared light content is larger in the case of the incandescent lamp compared to the fluorescent lamp. In particular, when the correction coefficient is 24, the infrared light content ratio becomes approximately 1.0; by using either one of the light sources, the infrared light content ratio can be similarly reduced.

The above results indicate that as the correction coefficient is increased, in the spectral properties of the first light receiving element 21 with a black cover, the relative sensitivity in the infrared light area is reduced, and the spectral properties come near the luminosity factor properties. Said differently, it is proven that by controlling the correction coefficient, the adverse effects of the black cover can be efficiently removed.

[Timing Chart]

Figure 6:
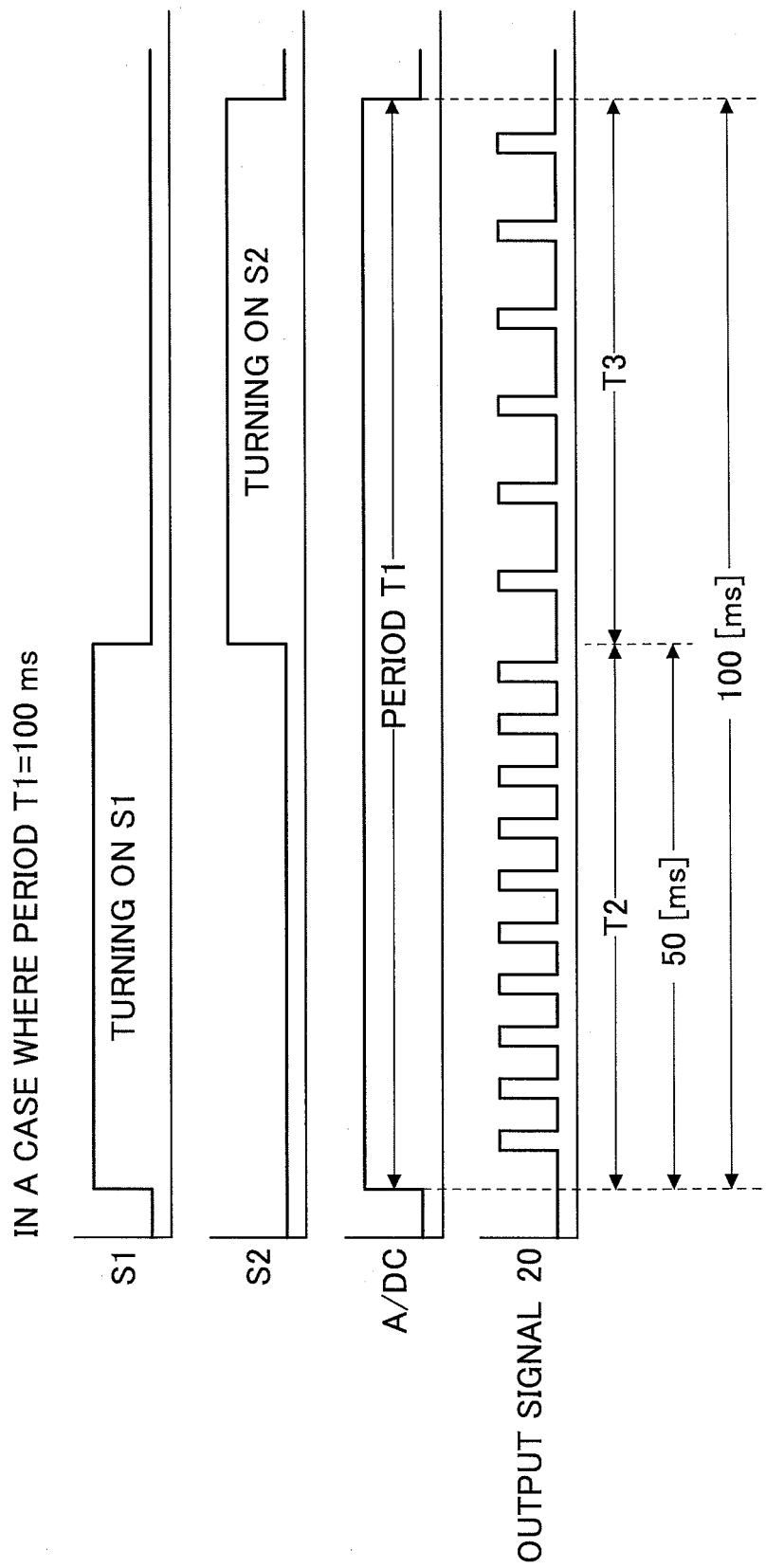
FIG. 6 is an example of a timing chart of an AD converter according to the embodiment of the present invention.

FIGS. 6 and 7 illustrate a time chart of the AD converter 313. FIG. 6 is a timing chart when the AD conversion period is 100 [ms]. FIG. 7 is a timing chart when the AD conversion period is 50 [ms].

The period during which the AD converter 313 performs AD conversion on the input signal 24 or the input signal 25 is set as a period T1. The period during which the AD converter 313 performs AD conversion on the input signal 24 is set as a period T2, and the period during which the AD converter 313 performs AD conversion on the input signal 25 is set as a period T3. Period T1, period T2, and period T3 may be arbitrarily set.

From FIGS. 6 and 7, it can be seen that the timing when the switch circuit 311 is on and the timing when the switch circuit 312 is on do not coincide with each other. When the switch circuit 311 is on, the AD converter 313 performs AD conversion only on the input signal 24, and when the switch circuit 312 is on, the AD converter 313 performs AD conversion only on the input signal 25. Said differently, the AD converter 313 alternately performs AD conversion by time division on the input signal 24 and the input signal 25.

When the period T1 is 100 [ms], for example, the control circuit 317 sets the period T2 and the period T3 as 50 [ms], and controls the switching of on/off of the switch circuit 311 and the switch circuit 312 at every 50 [ms]. In this case, the AD converter 313 alternately takes in the input signal 24 and the input signal 25 every 50 [ms] one time, performs AD conversion, and outputs the digital signal for the illuminance sensor once, and outputs the digital signal for luminosity factor correction once.

When the period T1 is 50 [ms], for example, the control circuit 317 sets the period T2 and the period T3 as 6.25 [ms], and controls the on/off of the switch circuit 311 and the switch circuit 312 at every 6.25 [ms]. In this case, the AD converter 313 alternately takes in the input signal 24 and the input signal 25 every 6.25 [ms] four times, performs AD conversion, and outputs the digital signal for the illuminance sensor four times, and outputs the digital signal for luminosity factor correction four times. By increasing the frequency of taking in the signals and outputting the signals, it is possible to reduce the ripple (fluctuation in the light amount) of the fluorescent light according to 50/60 Hz frequency of the AC voltage source.

The semiconductor integrated circuit for the optical sensor may be provided with an LED driving circuit for driving an infrared light LED for a proximity sensor. In this case, the timing of driving the LED driving circuit is controlled by a control circuit provided outside the luminosity factor correction unit, so as to synchronize with a digital signal corresponding to the output current of the third light receiving element 23 that is the light receiving element for a proximity sensor. Therefore, the timing of AD conversion at the luminosity factor correction unit (see FIGS. 6 and 7), and the timing of driving the LED driving circuit, are separately controlled.

As described above, according to the luminosity factor correction unit according to the present embodiment, two input signals are alternately subjected to AD conversion by the same AD converter, and arithmetic processing is performed, to perform the luminosity factor correction. Therefore, the precision can be easily secured even with respect to a weak current, and luminosity factor correction can be performed with high precision. As a result, the detection precision of the semiconductor integrated circuit for the optical sensor is increased.

The present invention is not limited to the specific embodiments described herein, and variations and modifications may be made without departing from the scope of the present invention.

According to an embodiment of the present invention, there is provided a semiconductor integrated circuit for the optical sensor for performing luminosity factor correction with high precision.

In embodiment, the semiconductor integrated circuit for the optical sensor of the present invention may be utilized in mobile phone or TV.

All examples and conditional language recited herein are intended for pedagogical purposes to aid the reader in understanding the embodiments and the concepts contributed by the inventor to furthering the art, and are to be construed as being without limitation to such specifically recited examples and conditions, nor does the organization of such examples in the specification relate to a showing of superiority or inferiority of the embodiments. Although the semiconductor integrated circuit for an optical sensor has been described in detail, it should be understood that the various changes, substitutions, and alterations could be made hereto without departing from the spirit and scope of the invention.

What is claimed is:

1. A semiconductor integrated circuit for an optical sensor for receiving an environmental light through a cover member that attenuates visible light and transmits infrared light and a collecting lens, performing luminosity factor correction based on an amount of received light, and detecting an illuminance of the environmental light, the semiconductor integrated circuit for the optical sensor comprising:
   a first light receiving element having a first spectral property;
   a second light receiving element having a second spectral property; and
   a luminosity factor correction unit configured to perform the luminosity factor correction according to output of the first light receiving element and output of the second light receiving element,
   wherein the luminosity factor correction unit comprises:
      an AD conversion unit configured to perform AD conversion by time division on the output of the first light receiving element and the output of the second light receiving element, and
      a calculating unit configured to subtract digital signals obtained by the conversion at the AD conversion unit.

2. The semiconductor integrated circuit for the optical sensor according to claim 1,
wherein the first spectral property is obtained by a first filter for transmitting the visible light, and
the second spectral property is obtained by a second filter for transmitting the infrared light.

3. The semiconductor integrated circuit for the optical sensor according to claim 2,
wherein the luminosity factor correction unit comprises:
a multiplier configured to multiply the digital signal corresponding to the output of the second light receiving element by a correction coefficient, and
a correction coefficient setting unit configured to set the correction coefficient.

4. The semiconductor integrated circuit for the optical sensor according to claim 1,
wherein the luminosity factor correction unit comprises:
a multiplier configured to multiply the digital signal corresponding to the output of the second light receiving element by a correction coefficient, and
a correction coefficient setting unit configured to set the correction coefficient.

5. The semiconductor integrated circuit for the optical sensor according to claim 1, further comprising a proximity sensor.

6. A semiconductor integrated circuit for an optical sensor for receiving an environmental light, performing luminosity factor correction based on an amount of received light, and detecting an illuminance of the environmental light, the semiconductor integrated circuit for the optical sensor comprising:
a proximity sensor;
a first light receiving element having a first spectral property, wherein the first spectral property has a first maximum sensitivity at a first wavelength;
a second light receiving element having a second spectral property, wherein the second spectral property has a second maximum sensitivity at a second wavelength, wherein the first wavelength is different from the second wavelength; and
a luminosity factor correction unit configured to perform the luminosity factor correction according to output of the first light receiving element and output of the second light receiving element.

7. The semiconductor integrated circuit for the optical sensor according to claim 6, wherein the luminosity factor correction unit comprises:
an AD conversion unit configured to perform AD conversion by time division on the output of the first light receiving element and the output of the second light receiving element, and
a calculating unit configured to subtract digital signals obtained by the conversion at the AD conversion unit.

8. The semiconductor integrated circuit for the optical sensor according to claim 6, wherein the luminosity factor correction unit comprises:
a multiplier configured to multiply the digital signal corresponding to the output of the second light receiving element by a correction coefficient, and
a correction coefficient setting unit configured to set the correction coefficient.

9. The semiconductor integrated circuit for the optical sensor according to claim 6,
wherein the first spectral property is obtained by a first filter for transmitting a first light having the first wavelength, and
the second spectral property is obtained by a second filter for transmitting a second light having the second wavelength.

10. The semiconductor integrated circuit for the optical sensor according to claim 6,
wherein the first spectral property is obtained by a first filter for transmitting a visible light having the first wavelength, and
the second spectral property is obtained by a second filter for transmitting a non-visible light having the second wavelength.

* * * * *